Oct. 27, 1931.  E. ATTESLANDER  1,828,992

DIESEL ELECTRIC LOCOMOTIVE

Filed May 2, 1931

Patented Oct. 27, 1931

1,828,992

UNITED STATES PATENT OFFICE

EDOUARD ATTESLANDER, OF WINTERTHUR, SWITZERLAND, ASSIGNOR TO THE FIRM OF SULZER FRERES SOCIETE ANONYME, OF WINTERTHUR, SWITZERLAND

DIESEL-ELECTRIC LOCOMOTIVE

Application filed May 2, 1931, Serial No. 534,606, and in Switzerland May 8, 1930.

This invention relates to Diesel-electric locomotives having as the source of power at least two internal combustion engines each coupled to a generator. According to the invention the driving axles are driven by two electric traction motors, one motor of each pair being supplied with current from one generator and the other motor of each pair being supplied with current from the other or another generator.

In order that the invention may be clearly understood and readily carried into effect, three locomotives in accordance therewith will now be described by way of example with reference to the accompanying diagrammatic drawings.

Figure 1:
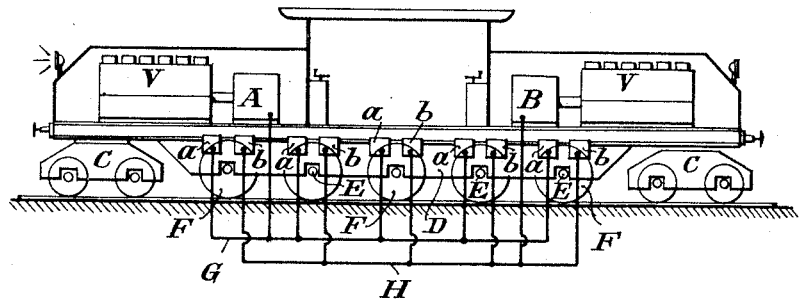

Figure 1 shows a locomotive in which the source of power consists of two internal combustion engines V, coupled respectively to generators A and B, the whole being mounted on a frame D and bogies C. Each pair of driving wheels F arranged on driving axles E is provided with two driving motors $a$ and $b$, of which one is fed by one generator and the other by the other generator. This may be effected by making the generator A supply a distributing system G from which all the motors $a$ are fed, while the generator B supplies a distributing system H from which all the motors $b$ are fed.

Figure 2:
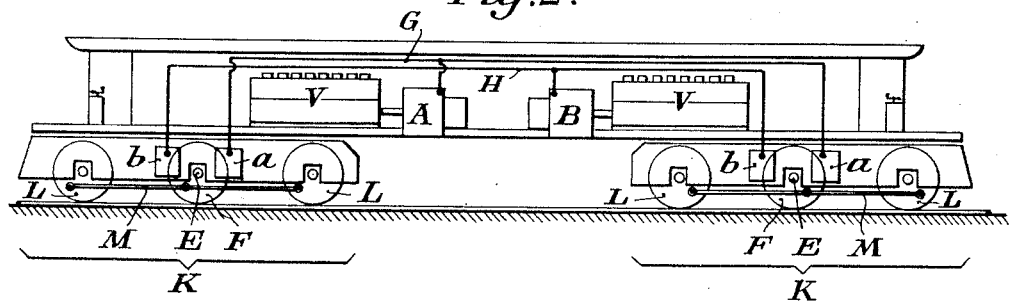

In the locomotive shown in Figure 2 the drive takes place through the driving axles E of two bogie frames K. The driving wheels F are connected to wheels L by coupling rods M. Each driving axle E has two driving motors $a$ and $b$, the motors $a$ being fed by the generator A and the motors $b$ by the generator B.

Figure 3:
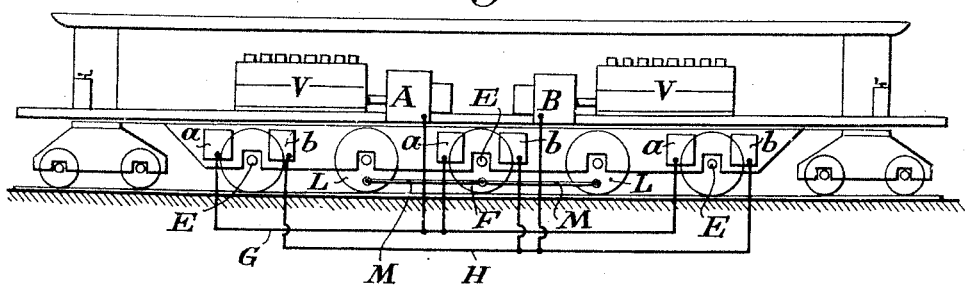

Figure 3 shows a locomotive constructed on the same basic principles and differing from that of Figure 1 in that only three axles E are driven by electric motors $a$ and $b$ and two axles are connected to one of the driving wheels F through the running wheels L and coupling rods M. The feed of one motor of each driving axle takes place through one generator, and that of the other motor through the other generator.

The two current distributing systems G and H can if desired be connected together.

By means of the arrangement described one driving motor is available for each driving axle in the event of failure or stoppage of one of the internal combustion engines. Thus in the locomotive shown in Figure 1 all the driving axles will be driven so that the ability of the locomotive to run will not be affected in spite of failure of part of the power generating plant, and uniform tractive force is ensured.

I claim:

1. In a Diesel-electric locomotive the combination with two internal combustion engines, of two electric generators one for each internal combustion engine and of driving axles each driven by two electric traction motors, one motor of each pair being supplied with current from one generator and the other motor of each pair being supplied with current from the other generator.

2. In a Diesel-electric locomotive the combination with at least two internal combustion engines of at least two electric generators one for each internal combustion engine and of driving axles each driven by two electric traction motors, one motor of each pair being supplied with current from one generator and the other motor of each pair being supplied with current from another generator.

In testimony whereof I have affixed my signature.

EDOUARD ATTESLANDER.